(12) United States Patent
Esparza

(10) Patent No.: US 10,960,843 B2
(45) Date of Patent: Mar. 30, 2021

(54) AIRBAG CUSHION COVER TEAR SEAM

(71) Applicant: Key Safety Systems, Inc., Sterling Heights, MI (US)

(72) Inventor: Victor Esparza, El Paso, TX (US)

(73) Assignee: Key Safety Systems, Inc., Sterling Heights, MI (US)

( * ) Notice: Subject to any disclaimer, the term of this patent is extended or adjusted under 35 U.S.C. 154(b) by 182 days.

(21) Appl. No.: 16/207,538

(22) Filed: Dec. 3, 2018

(65) Prior Publication Data

US 2019/0184928 A1 Jun. 20, 2019

Related U.S. Application Data

(60) Provisional application No. 62/598,514, filed on Dec. 14, 2017.

(51) Int. Cl.
| | |
|---|---|
| *B60R 21/16* | (2006.01) |
| *B60R 21/2165* | (2011.01) |
| *B60R 21/2342* | (2011.01) |
| *B60R 21/235* | (2006.01) |
| *B60R 21/201* | (2011.01) |

(52) U.S. Cl.
CPC ........ *B60R 21/2165* (2013.01); *B60R 21/201* (2013.01); *B60R 21/235* (2013.01); *B60R 21/2342* (2013.01); *B60R 2021/23509* (2013.01); *B60R 2021/23533* (2013.01)

(58) Field of Classification Search
CPC ............... B60R 21/201; B60R 21/207; B60R 2021/0006; Y10T 442/30
USPC ...................................................... 280/728.3
See application file for complete search history.

(56) References Cited

U.S. PATENT DOCUMENTS

| | | | |
|---|---|---|---|
| 5,221,108 A | 6/1993 | Hirabavashi | |
| 6,099,026 A | 8/2000 | Ando et al. | |
| 6,224,090 B1 * | 5/2001 | Lutze | B60R 21/2165 280/728.3 |
| 6,682,093 B2 | 1/2004 | Tajima et al. | |
| 7,025,374 B2 * | 4/2006 | Evans | B60R 21/2165 280/728.3 |
| 7,357,408 B2 | 4/2008 | Hall et al. | |
| 7,748,732 B2 | 7/2010 | Sella et al. | |
| 8,171,836 B2 | 5/2012 | Kalisz et al. | |

(Continued)

FOREIGN PATENT DOCUMENTS

| | | |
|---|---|---|
| DE | 102009042308 | 3/2011 |
| EP | 3168089 | 5/2017 |
| JP | 4475902 | 6/2010 |

*Primary Examiner* — Toan C To
(74) *Attorney, Agent, or Firm* — Meunier Carlin & Curfman LLC

(57) ABSTRACT

A cover for an airbag cushion has a fabric for enclosing a folded airbag cushion forming the cover and a frangible tear seam extending across the length of the cover. The tear seam has a plurality of slits. Each slit includes a linear main slit portion arranged in a straight line, an inclined leading end slit portion and an inclined trailing end slit portion. A space between each adjacent slit forms a single fabric tear portion defined by a trailing end slit portion of one slit overlapping an inclined oppositely leading end slit portion of an adjacent slit. Each fabric tear portion is formed as short cut woven yarns cut axially and perpendicularly relative to the longitudinal axis, the plurality of fabric tear portions forms the frangible tear seam.

19 Claims, 3 Drawing Sheets

(56) References Cited

U.S. PATENT DOCUMENTS

| | | |
|---|---|---|
| 8,573,632 B1 | 11/2013 | Barr |
| 9,409,544 B1 | 8/2016 | Cischke et al. |
| 2004/0160043 A1* | 8/2004 | Litjens ................ B60R 21/2165 |
| | | 280/732 |
| 2012/0038133 A1* | 2/2012 | Kalisz ................. B60R 21/2165 |
| | | 280/728.3 |

* cited by examiner

AIRBAG CUSHION COVER TEAR SEAM

FIELD OF THE INVENTION

The present invention relates to an airbag cover, more specifically to an airbag cover with a frangible tear seam.

BACKGROUND OF THE INVENTION

Historically, dust covers or airbag covers are provided to protect an airbag cushion generally. A curtain airbag cushion employs a dust cover that protects the airbag cushion when it is in a folded and undeployed state. This cover is designed to protect the cushion and keep it in a constrained condition by encircling the airbag cushion to keep it in its proper folded state. On deployment, the dust cover must open to allow the airbag cushion to expand and inflate. To do this efficiently, tear seams have been provided on airbag dust covers. In U.S. Pat. No. 6,682,093, a typical airbag dust cover is illustrated in prior art FIG. 1 wherein the tear seam line is shown as a plurality of straight slits cut into the fabric and the space between the slits provides a location for the airbag dust cover to be weakened sufficiently that it will tear along these lines.

This form of simple linear slits while efficient, is not predictable in many regards and in some cases, causes the airbag to underinflate from meeting some resistance as the airbag cover does not tear evenly across the slits.

An improvement was discovered in U.S. Pat. No. 7,748,732, wherein the slits were oriented on a slight inclination as opposed to a linear straight line as illustrated in prior art FIG. 2. The slits were provided as a plurality of short lines that slightly overlapped vertically by being on a slight inclination. This creates a much more efficient weakening along the tear seam. Other shapes such as herringbone patterns or zig zag portion have been contemplated even a use of a plurality of rows of slits has been considered to provide an efficient tearing across an airbag cover, as illustrated in U.S. Pat. No. 7,357,408.

It has been determined that the use of tear seams on dust covers can be improved by a more efficient use of the tear seam as disclosed in the present invention hereinafter. The advantage of the present invention tear seam is that it is entirely adjustable such that a uniform tearing at each location between adjacent slits can be achieved and this tearing can be adjusted in terms of strength of tear.

SUMMARY OF THE INVENTION

A cover for an airbag cushion has a fabric for enclosing a folded airbag cushion forming the cover and a frangible tear seam extending across the length of the cover. The tear seam has a plurality of slits. Each slit includes a linear main slit portion arranged in a straight line, an inclined leading end slit portion and an inclined trailing end slit portion. The main slit portion forms a longitudinal extending axis along the cover. The leading end slit portion and trailing end slit portion of each slit is inclined oppositely relative to the main slit portion. A space between each adjacent slit forms a single fabric tear portion defined by a trailing end slit portion of one slit overlapping an inclined oppositely leading end slit portion of an adjacent slit. Each fabric tear portion is formed as short cut woven yarns cut axially and perpendicularly relative to the longitudinal axis, the plurality of fabric tear portions forms the frangible tear seam.

In one embodiment, the leading end slit portion and trailing end slit portion of each slit are equal, but oppositely inclined. Each trailing end slit portion and leading end slit portion has a terminal end, and extends outwardly a distance where the trailing end slit portion at the terminal end of one slit aligns longitudinally relative to the longitudinal axis with the leading end slit portion at the terminal end of an adjacent slit. Each trailing end slit portion and leading end slit portion can be formed as straight inclined slits. Alternatively, each leading end slit portion and each trailing end slit portion are formed as curved slits of equal contours, but oppositely oriented relative to the longitudinal axis.

The space between the trailing end slit portion and the leading end slit portion of an adjacent slit defines both the axial length and a length transverse to the longitudinal axis of the yarns of each fabric tear portion. The space between the trailing end slit portion and the leading end slit portion can be increased or decreased by lengthening or shortening the distance between adjacent slits. Alternatively, the space between the trailing end slit portion and the leading end slit portion can be increased or decreased by decreasing the inclination or increasing the inclination of the leading end slit portion and trailing end slit portion. The plurality of fabric tear portion each has a tear strength and the tear strength is adjustable based on spacing of adjacent slits and/or by adjusting the inclination of the leading end slit portion and trailing end slit portion. The frangible tear seam has a rupture line which tears on airbag inflation substantially along the longitudinal axis laying at least within the fabric tear portion between the terminal ends of the leading end slit portion and trailing end slit portion of adjacent slits.

A method of manufacturing a cover for an airbag cushion, the method includes providing a fabric for enclosing a folded airbag cushion forming the cover; forming a frangible tear seam extending across the length of the cover the tear seam having a plurality of slits. Each slit includes a linear main slit portion arranged in a straight line, an inclined leading end slit portion and an inclined trailing end slit portion. The main slit portion forms a longitudinal extending axis along the cover. The leading end slit portion and trailing end slit portion of each slit is inclined oppositely relative to the main slit portion. By selecting a space between each adjacent slit, the space forms a single fabric tear portion, defined by a trailing end slit portion of one slit overlapping an inclined oppositely leading end slit portion of an adjacent slit wherein each fabric tear portion is formed as short cut woven yarn cuts axially and perpendicularly relative to the longitudinal axis. The plurality of fabric tear portions forms the frangible tear seam.

The method further includes having the leading end slit portion and trailing end slit portion of each slit are equal, but oppositely inclined. Each trailing end slit portion and leading end slit portion has a terminal end, and extends outwardly a distance where the trailing end slit portion at the terminal end of one slit aligns longitudinally relative to the longitudinal axis with the leading end slit portion at the terminal end of an adjacent slit.

The method further includes the step of cutting each trailing end slit portion and leading end slit portion to be formed as straight inclined slits. The method further includes the step of cutting each leading end slit portion and each trailing end slit portion are formed as curved slits of equal contours, but oppositely oriented relative to the longitudinal axis.

The method further includes the step of adjusting the space wherein the space between the trailing end slit portion and the leading end slit portion of an adjacent slit defines both the axial length and a length transverse to the longitudinal axis of the yarns of each fabric tear portion; and wherein the space between the trailing end slit portion and the leading end slit portion can be increased or decreased by lengthening or shortening the distance between adjacent slits.

The method further includes the step of adjusting the space wherein the space between the trailing end slit portion and the leading end slit portion of an adjacent slit defines both the axial length and a length transverse to the longitudinal axis of the yarns of each fabric tear portion; and wherein the space between the trailing end slit portion and the leading end slit portion can be increased or decreased by decreasing the inclination or increasing the inclination of the leading end slit portion and trailing end slit portion.

The method further includes the step of adjusting the space wherein the space between the trailing end slit portion and the leading end slit portion of an adjacent slit defines both the axial length and a length transverse to the longitudinal axis of the yarns of each fabric tear portion; and wherein the plurality of fabric tear portion each has a tear strength and the tear strength is adjustable based on spacing of adjacent slits and inclination of the leading end slit portion and trailing end slit portion.

The method further includes forming the frangible tear seam along a rupture line which tears on airbag inflation substantially along the longitudinal axis laying at least within the fabric tear portion between the terminal ends of the leading end slit portion and trailing end slit portion of adjacent slits.

BRIEF DESCRIPTION OF THE DRAWINGS

The invention will be described by way of example and with reference to the accompanying drawings in which.

DETAILED DESCRIPTION OF THE INVENTION

Figure 1:
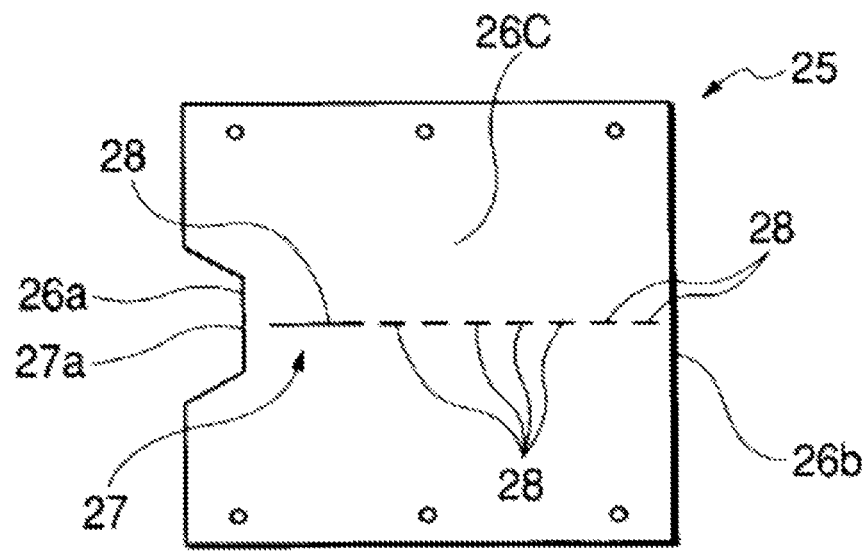
FIG. 1 is a plan view of an airbag cover according to the prior art.
Figure 2:
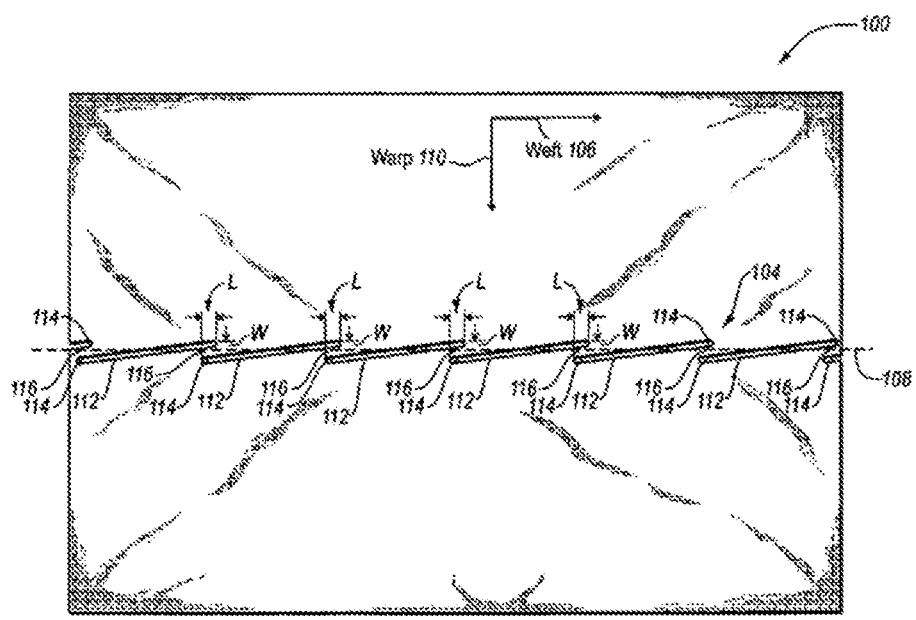
FIG. 2 is a second airbag cover according to the prior art.

With reference to FIGS. 1 and 2, prior art dust covers are illustrated. The prior art dust cover of FIG. 1 shows a series of straight lines lying along a linear path that bisect the dust cover and provide an initial tear seam. As illustrated, the dust cover 27 has a plurality of slits 28 formed along a line extending from a cutout along an edge 26a extending to an opposite side 26b. The fabric of the dust cover is illustrated as 26C. As shown, the initial tear occurs at the elongated slit 28 near the notched portion 26a and 27a forms a rupture line, as shown in prior art U.S. Pat. No. 6,099,026 with its associated reference numerals. With reference to FIG. 2, the straight lines are shown on a slight inline on the embodiment 100 of this prior art invention. This inclination provides an overlap of the straight lines such that the fabric is torn between the overlapping portions of each of the inclined slits, as shown in prior art U.S. Pat. No. 7,748,732 with its associated reference numerals.

Figure 3:
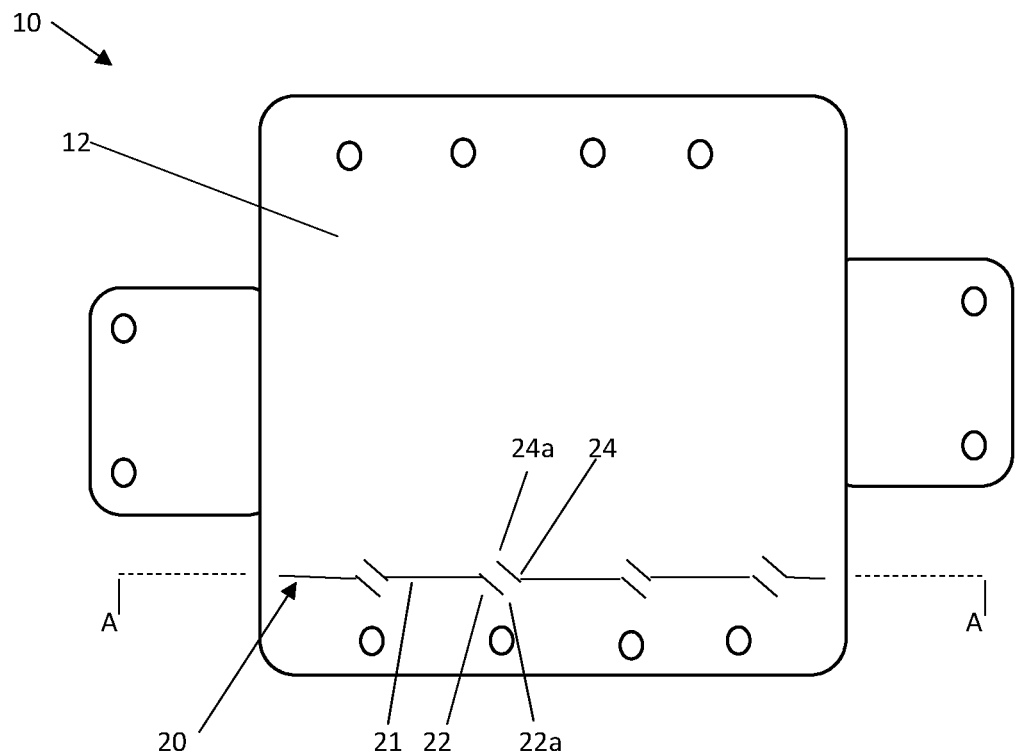
FIG. 3 is a plan view of a first embodiment of a dust cover according to the present invention.
Figure 3A:
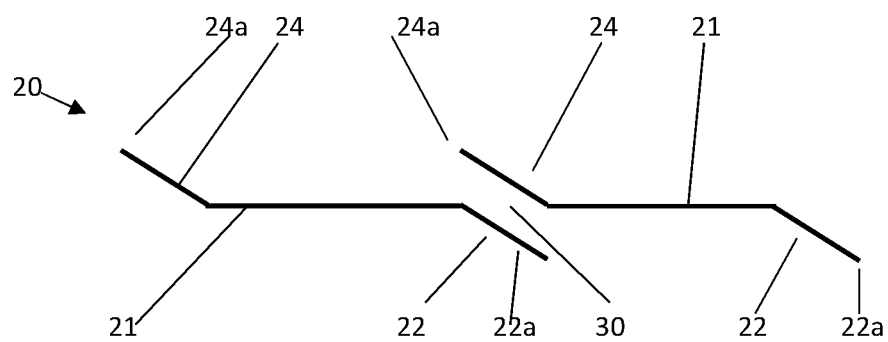
FIG. 3A is an illustration of the first embodiment slit taken from FIG. 3.

With reference to FIG. 3, an exemplary dust cover 10 of a first embodiment of the invention is illustrated. The exemplary dust cover 10 is made of a woven fabric and has a plurality of holes for attachment to a vehicle when installed about an airbag cushion (not illustrated). As shown, there are a plurality of slits 20 arranged along a longitudinal axis A. The plurality of slits 20 extend from left to right across the fabric 12 of the cover 10. As illustrated in FIG. 3A, the plurality of slits 20 are illustrated, each slit 20 having a main slit portion 21 and a leading end slit portion 22 with a trailing end slit portion 24. As shown in FIG. 3A, a pair of adjacent slits 20 each with a main slit portion 21 is illustrated. The space between a leading end slit portion 22 and a trailing end slit portion 24 of the adjacent slit 20 creates a fabric tear portion 30. The fabric tear portion 30 consists of a plurality of cut yarns in the fabric 12. As shown, each leading end slit portion 22 has a terminal end 22a and each trailing end slit portion 24 has a terminal end 24a. The terminal ends 22a, 24a align longitudinally with the main slit portions 21 such that the fabric tear portions 30 have a plurality of short cut yarns lying between adjacent leading and trailing end slit portions.

Figure 4:
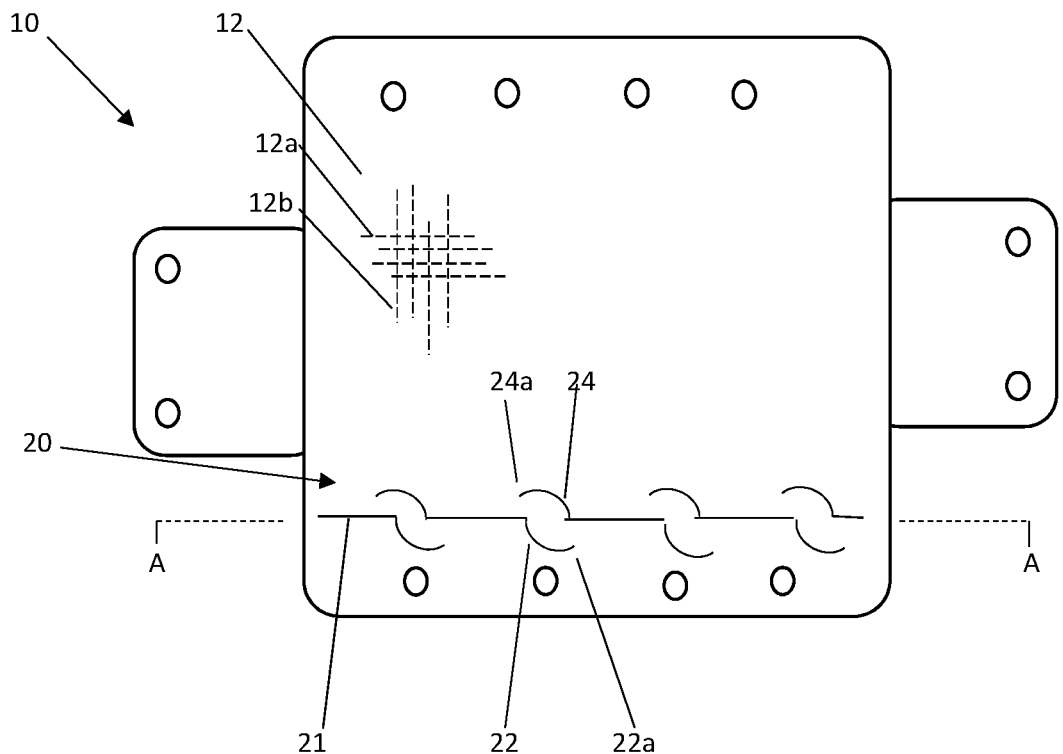
FIG. 4 is a plan view of a second embodiment of a dust cover according to the present invention.
Figure 4A:
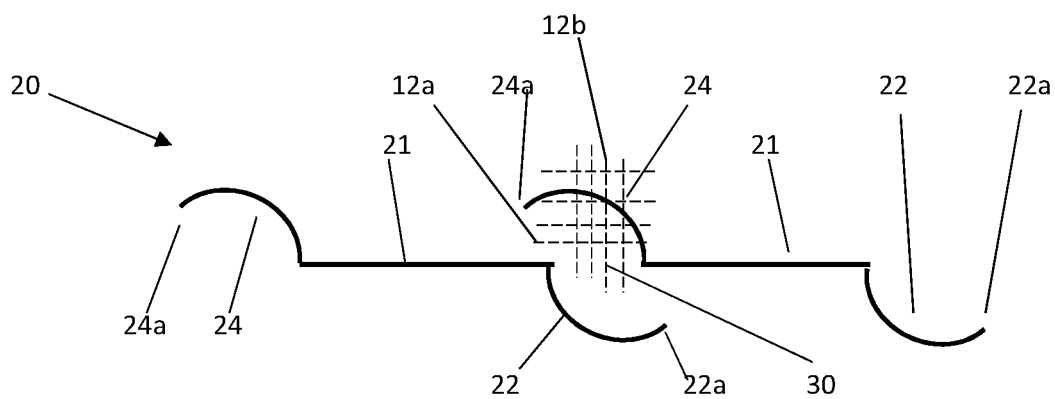
FIG. 4A is an illustration of the second embodiment slit taken from FIG. 4.

With reference to FIG. 4, a second embodiment dust cover 10 of the present invention is illustrated wherein the plurality of slits 20 have a curved leading end slit portion 22 and a complimentary curved trailing end slit portion 24 on each end of the main slit portion 21. Each of the plurality of slits 20 has the straight main slit portion 21 with a curved leading end slit portion 22 extending to overlap a main slit portion 21 of an adjacent main slit portion 21. Similarly, the curved trailing end slit portion 24 of the main slit portion 21 also overlaps an adjacent main slit portion 21. This space between the curved leading and trailing end slit portions 22, 24 of adjacent slits 20 creates the fabric tear portion 30 which consists of short cut yarn lines as shown. Due to the fact the terminal ends 22a and 24a overlap the main slit portions 21 means that the fabric tear portions 30 are made of a plurality of short yarns.

In a woven fabric material 12, the weft 12a and warp 12b yarns are such that that they lie in a pattern typically 90 degrees relative to the other, by example, one extending longitudinally and the other vertically in a woven pattern, as such, when the dust cover 10 is manufactured, the plurality of cut lines are such that the leading and trailing end slit portions 22, 24 cut both vertically and longitudinally extending yarns. This forces the tear seam extending along the length of the slits 20 to tear approximately along the longitudinal axis A, as illustrated, forming a rupture line when an airbag inflates that will occur substantially within the fabric tear portions 30, preferably at or near the longitudinal axis A.

As illustrated, the present invention first and second embodiments are designed such that the fabric tear strength of each fabric tear portion 30 can be adjusted by either changing the length of the leading and trailing end slit portions 22, 24 or the distance between the leading and trailing end slit portions 22, 24 which will decrease or increase the strength of the fabric tear portions 30 depending on the spacing. A smaller spacing weakens and a larger spacing strengthens. Alternatively, the inclination of either the curved or straight leading and trailing end slit portions 22, 24 can be adjusted such that the space between adjacent main slit portions 21 can be increased or decreased accordingly based on the inclination or length of each leading and trailing end slit portion 22, 24. This capability to adjust the strength of the fabric tear portion 30 means that for a heavier dust cover fabric, smaller fabric tear portions 30 may be employed that will break at a reasonably low strength reliably and consistently along a longitudinal axis A. When lighter weight fabric dust covers are employed, the spacing or inclination can be increased so the fabric tear portion 30 has sufficient strength that it does not inadvertently tear before an airbag inflation occurs.

As shown, the present invention provides a unique way of providing an adjustment capability for the plurality of adjacent slits 20. This is not possible with the prior art slits because the present invention leading and trailing end slit portions 22, 24 work to complimentarily assist each other in establishing the tear strength at the fabric tear portion 30.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A cover for an airbag cushion, the cover comprising:
   a fabric for enclosing a folded airbag cushion forming the cover;
   a frangible tear seam extending across the length of the cover, the tear seam having a plurality of slits, each slit including a linear main slit portion arranged in a straight line and the main slit portion forming a longitudinal extending axis along the cover, an inclined leading end slit portion and an inclined trailing end slit portion wherein the leading end slit portion and trailing end slit portion of each slit is inclined oppositely relative to the main slit portion; and
   wherein a space between each adjacent slit forms a single fabric tear portion, defined by a trailing end slit portion of one slit overlapping an oppositely inclined leading end slit portion of an adjacent slit wherein each fabric tear portion is formed as short cut woven yarns cut axially and perpendicularly relative to the longitudinal axis, the plurality of fabric tear portions forms the frangible tear seam.

2. The cover for an airbag cushion of claim 1 wherein the leading end slit portion and trailing end slit portion of each slit are equal, but oppositely inclined.

3. The cover of an airbag cushion of claim 2 wherein each trailing end slit portion and leading end slit portion has a terminal end, and extends outwardly a distance where the trailing end slit portion at the terminal end of one slit aligns longitudinally relative to the longitudinal axis with the leading end slit portion at the terminal end of an adjacent slit.

4. The cover of an airbag cushion of claim 3 wherein each trailing end slit portion and leading end slit portion are formed as straight inclined slits.

5. The cover of an airbag cushion of claim 3 wherein each leading end slit portion and each trailing end slit portion are formed as curved slits of equal contours, but oppositely oriented relative to the longitudinal axis.

6. The cover of an airbag cushion of claim 4 wherein the space between the trailing end slit portion and the leading end slit portion of an adjacent slit defines both an axial length and a length transverse to the longitudinal axis of the yarns of each fabric tear portion.

7. The cover of an airbag cushion of claim 1 wherein the space between the trailing end slit portion and the leading end slit portion can be increased or decreased by lengthening or shortening a distance between adjacent slits.

8. The cover of an airbag cushion of claim 1 wherein the space between the trailing end slit portion and the leading end slit portion can be increased or decreased by decreasing or increasing an inclination of the leading end slit portion and trailing end slit portion.

9. The cover of an airbag cushion of claim 1 wherein the plurality of fabric tear portion each has a tear strength and the tear strength is adjustable based on spacing of adjacent slits and/or by adjusting an inclination of the leading end slit portion and trailing end slit portion.

10. The cover of an airbag cushion of claim 3 wherein the frangible tear seam has a rupture line which tears on airbag inflation substantially along the longitudinal axis laying at least within the fabric tear portion between the terminal ends of the leading end slit portion and trailing end slit portion of adjacent slits.

11. A method of manufacturing a cover for an airbag cushion, the method comprising:
    providing a fabric for enclosing a folded airbag cushion forming the cover;
    forming a frangible tear seam extending across the length of the cover the tear seam having a plurality of slits, each slit including a linear main slit portion arranged in a straight line and the main slit portion forming a longitudinal extending axis along the cover, an inclined leading end slit portion and an inclined trailing end slit portion wherein the leading end slit portion and trailing end slit portion of each slit is inclined oppositely relative to the main slit portion; and
    selecting a space between each adjacent slit, the space forms a single fabric tear portion, defined by a trailing end slit portion of one slit overlapping an oppositely inclined leading end slit portion of an adjacent slit wherein each fabric tear portion is formed as short cut woven yarn cuts axially and perpendicularly relative to the longitudinal axis, the plurality of fabric tear portions forms the frangible tear seam.

12. The method of claim 11 further comprises the leading end slit portion and trailing end slit portion of each slit are equal, but oppositely inclined.

13. The method of claim 11 wherein each trailing end slit portion and leading end slit portion has a terminal end, and extends outwardly a distance where the trailing end slit portion at the terminal end of one slit aligns longitudinally relative to the longitudinal axis with the leading end slit portion at the terminal end of an adjacent slit.

14. The method of claim 11 further comprises the step of cutting each trailing end slit portion and leading end slit portion to be formed as straight inclined slits.

15. The method of claim 11 further comprises the step of cutting each leading end slit portion and each trailing end slit portion are formed as curved slits of equal contours, but oppositely oriented relative to the longitudinal axis.

16. The method of claim 11 further comprises the step of adjusting the space wherein the space between the trailing end slit portion and the leading end slit portion of an adjacent slit defines both an axial length and a length transverse to the longitudinal axis of the yarns of each fabric tear portion; and wherein the space between the trailing end slit portion and the leading end slit portion can be increased or decreased by lengthening or shortening a distance between adjacent slits.

17. The method of claim 11 further comprises the step of adjusting the space wherein the space between the trailing end slit portion and the leading end slit portion of an adjacent slit defines both an axial length and a length transverse to the longitudinal axis of the yarns of each fabric tear portion; and wherein the space between the trailing end slit portion and the leading end slit portion can be increased or decreased by decreasing or increasing an inclination of the leading end slit portion and trailing end slit portion.

18. The method of claim 11 further comprises the step of adjusting the space wherein the space between the trailing end slit portion and the leading end slit portion of an adjacent slit defines both the axial length and a length transverse to the longitudinal axis of the yarns of each fabric tear portion; and wherein the plurality of fabric tear portion each has a tear strength and the tear strength is adjustable based on spacing of adjacent slits and inclination of the leading end slit portion and trailing end slit portion.

19. The method of claim 11 further comprises forming the frangible tear seam along a rupture line which tears on airbag inflation substantially along the longitudinal axis laying at least within the fabric tear portion between the terminal ends of the leading end slit portion and trailing end slit portion of adjacent slits.

* * * * *